(12) United States Patent
Lavelle et al.

(10) Patent No.: US 7,375,826 B1
(45) Date of Patent: May 20, 2008

(54) HIGH SPEED THREE-DIMENSIONAL LASER SCANNER WITH REAL TIME PROCESSING

(75) Inventors: Joseph P. Lavelle, Los Altos, CA (US);
Stefan R. Schuet, Sunnyvale, CA (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 548 days.

(21) Appl. No.: 10/956,517

(22) Filed: Sep. 23, 2004

(51) Int. Cl.
*G01B 11/24* (2006.01)
*G01B 11/30* (2006.01)

(52) U.S. Cl. ..................... 356/607; 356/606
(58) Field of Classification Search ............. None
See application file for complete search history.

(56) References Cited

U.S. PATENT DOCUMENTS

| | | | | |
|---|---|---|---|---|
| 4,158,507 | A * | 6/1979 | Himmel ................ | 356/608 |
| 5,118,192 | A * | 6/1992 | Chen et al. ............ | 356/602 |
| 5,198,877 | A * | 3/1993 | Schulz ................. | 356/614 |
| 5,495,337 | A * | 2/1996 | Goshorn et al. ........ | 356/601 |
| 5,654,800 | A | 8/1997 | Svetkoff et al. | |
| 5,818,061 | A * | 10/1998 | Stern et al. ........... | 250/559.29 |
| 5,969,822 | A * | 10/1999 | Fright et al. .......... | 356/608 |
| 6,031,225 | A * | 2/2000 | Stern et al. ........... | 250/235 |
| 6,064,759 | A * | 5/2000 | Buckley et al. ........ | 382/154 |
| 6,181,472 | B1 | 1/2001 | Liu | |
| 6,205,243 | B1 * | 3/2001 | Migdal et al. ......... | 382/154 |
| 6,577,405 | B2 * | 6/2003 | Kranz et al. .......... | 356/601 |
| 6,603,103 | B1 * | 8/2003 | Ulrich et al. .......... | 250/205 |
| 2002/0140949 | A1 * | 10/2002 | Sasaki et al. .......... | 356/606 |
| 2004/0100639 | A1 * | 5/2004 | Sung et al. ........... | 356/605 |

OTHER PUBLICATIONS

Lavelle, et al., High Speed 3D Scanner with Real-Time 3D Processing, SIcon/04—Sensors for Industry Conference, Jan. 27-29, 2004, New Orleans, Louisana.

(Continued)

*Primary Examiner*—Michael P. Stafira
(74) *Attorney, Agent, or Firm*—John F. Schipper; Robert M. Padilla

(57) ABSTRACT

A laser scanner computes a range from a laser line to an imaging sensor. The laser line illuminates a detail within an area covered by the imaging sensor, the area having a first dimension and a second dimension. The detail has a dimension perpendicular to the area. A traverse moves a laser emitter coupled to the imaging sensor, at a height above the area. The laser emitter is positioned at an offset along the scan direction with respect to the imaging sensor, and is oriented at a depression angle with respect to the area. The laser emitter projects the laser line along the second dimension of the area at a position where a image frame is acquired. The imaging sensor is sensitive to laser reflections from the detail produced by the laser line. The imaging sensor images the laser reflections from the detail to generate the image frame. A computer having a pipeline structure is connected to the imaging sensor for reception of the image frame, and for computing the range to the detail using height, depression angle and/or offset. The computer displays the range to the area and detail thereon covered by the image frame.

26 Claims, 6 Drawing Sheets

OTHER PUBLICATIONS

Lavelle, et al., High Speed 3D Scanner with Real-Time 3D Processing, IMTC 2004—Instrumentation and Measurement Technology Conference, May 18-20, 2004, Como, Italy.

Lavelle, et al., High speed 3D scanner with real-time 3D processing, ODIMAP IV Optoelectronic Distance/Displacement Measurements and Applications, Jun. 16-18, 2004Oulu, Finland.

Lavelle, et al., High-speed 3D scanner with real-time 3D processing, SPIE Photonics East 2003, Oct. 27-30, 2003.

* cited by examiner

# HIGH SPEED THREE-DIMENSIONAL LASER SCANNER WITH REAL TIME PROCESSING

BACKGROUND OF THE INVENTION

1. Field of Invention

This invention is in the field of laser scanners used for detection and measurement of three dimensional details on a target area.

2. Description of the Related Art

One challenge of scanning technology is that of translating the dimensions of an object into a computer compatible format. The idea is to acquire the object's image and digitize it for further digital manipulation. In this context, area scanners have been described to acquire the contours of an object by scanning the object and converting the image into a digital representation. For example, U.S. Pat. No. 5,969,822 to Fright et al. titled Arbitrary Geometry Laser Area Scanner describes an optical non-contact area scanning apparatus and method. The three dimensional coordinates of an illuminated profile or spot on the object are recorded and the area is reconstructed using spatial location and orientation information from a spatial location system associated with the object, illumination means and image recording means. The digitized output from Fright contains information about the image scanned by the apparatus.

Similarly, another example, U.S. Pat. No. 5,198,877 to Shulz titled Method and Apparatus for Three Dimensional Non-Contact Shape Sensing also describes sensing of numerous points on the area of an object utilizing two stages to sense a shape.

While both above systems and others in the prior art digitize an image into a computer file, at least two critical factors are only tangentially addressed, and need to be considered with respect to the present invention:

a) the time necessary to acquire the image inclusive of the time to process the acquired image information to detect small details in the image;

b) the degree of resolution to which the image has to be digitized to detect relatively small details within the image.

Typically, in the prior art, the object to be analyzed is presented to the image sensor, for example a Charge Coupled Device (CCD). The image of interest is contained in the output generated by the CCD, a large two dimensional array of individual pixel amplitudes. The output of the CCD is representative of the object presented to the camera and is processed to extract the image contained therein to create a usable computer file. The output from such a scanner is typically a large amount of data. For example, a digital image having 1024 by 1024 pixels, each pixel represented by 16 bits of amplitude to resolve small details, translates to approximately 16 million bits per image. The 16 million bits represent a substantial computational load, especially if thousands of images have to analyzed in minutes.

An approach towards reducing the time to process images of objects is to use an increased scan rate, that is, acquire more information per unit time. Such an approach is discussed in U.S. Pat. No. 6,031,225 to Stern et al, titled System and Method of Selective Scanning of an Object or Pattern Including Scan Correction. Here, an optical system quickly sweeps a light beam over the image to be acquired. A scan correction is applied to compensate for motion related errors.

However, even with the faster scan rate of the '225 patent, the rate of creating and analyzing images may be insufficient when a large number of images have to be captured and analyzed to detect small details in a short time. For example, where thousands of tiles each 3 in by 3 in have to be analyzed to detect relatively small details, such as area flaws in the order of 0.1 in by 0.1 in at a depth of 0.008 in, the prior art may not be satisfactory because of the delay involved to image the overall area of each tile and extract all features to the level where a small (0.1 by 0.1 by 0.008 in) detail is reliably detected. The prior art may require relatively large memories to store the output of high resolution analog to digital (A/D) converters. The high A/D resolution is needed to detect the small change corresponding to a small flaw in the object being examined, in the order of one part in 10000 (approximately 3 in/0.01 in). This means the computing load is quite large, and the analyzed results probably delayed, not available in real time. This is because a large amount of detailed (possibly 16 bit resolution) CCD data has to be stored, then processed to extract and detect the existence of small flaws on a large object. The large object is represented by a relatively vast digital output from the image(video) A/Ds, while the flaws are a small part ($1/10000$) thereof. Hence, the large computing load in detecting small flaws in a large digital image would delay output and the utility of a prior art system.

SUMMARY OF THE INVENTION

A laser scanner computes a range from a laser line to an imaging sensor. The laser line is emitted from a laser emitter, said laser line illuminating a detail within an area covered by said imaging sensor, said area having a first dimension and a second dimension, said detail having a dimension perpendicular to said area. The scanner comprises a traverse for moving said laser emitter coupled to said imaging sensor. Said traverse moves parallel to said first dimension of said area in a scan direction for a scan. The scan may be circular or rectilinear. The imaging sensor and said laser emitter are at a height above the area. The laser emitter is positioned at an offset along said scan direction with respect to said imaging sensor. Said laser emitter is oriented at a depression angle with respect to said area, said depression angle invariant during said scan. For a rectilinear scan, said laser emitter is projecting said laser line along said second dimension of said area at a frame first dimension position, said second dimension perpendicular to said scan direction over said area. The imaging sensor is sensitive to laser reflections from said detail produced by said laser line, said imaging sensor imaging said laser reflections from said detail within said area to generate a image frame, said image frame second dimension aligned along said second dimension and inclusive of said frame first dimension position. A computer, having a pipeline portion and auxiliary portion is connected to said imaging sensor for reception of said image frame. Said pipeline portion examines said image frame for the presence of reflections from said laser line illuminating said detail. The auxiliary portion of said computer computes the range to said laser line and said detail using said height, said depression angle and/or said offset.

The computer displays said range to said detail as indicative of said dimension of said detail on a display at a coordinate within said second dimension and said first dimension over said area covered by said image frame (the scan). It is envisioned that the pipeline portion of said computer and the auxiliary portion are combined into one, fully integrated computer where both the pipeline architecture is implemented as well as that of the auxiliary portion.

DETAILED DESCRIPTION

The present invention describes an apparatus and method for an improved laser scanner for ranging a laser line illuminating a three dimensional detail on a target area such as, for example, a flaw in a tile, facial features for human physiognomy, parts on a printed circuit board, or machined features on mechanical components. The target area is NOT stored in memory, but rather incorporated into the operation of the scanner by virtue of the structure and method of this invention. A fast range measurement is thus obtained from a composite image of the target area and details thereon derived from the laser reflections sensed by an imaging sensor.

The operation of the scanner is further accelerated by the use of a pipeline processor matched in performance to the output of an imaging sensor 101 acquiring the image. Because the image pixels are delivered in compatible increments and rate to the pipeline processor, and there is no need to store large intermediate results, the overall operation of generating range measurements is accelerated to obtain real time results.

Figure 1:
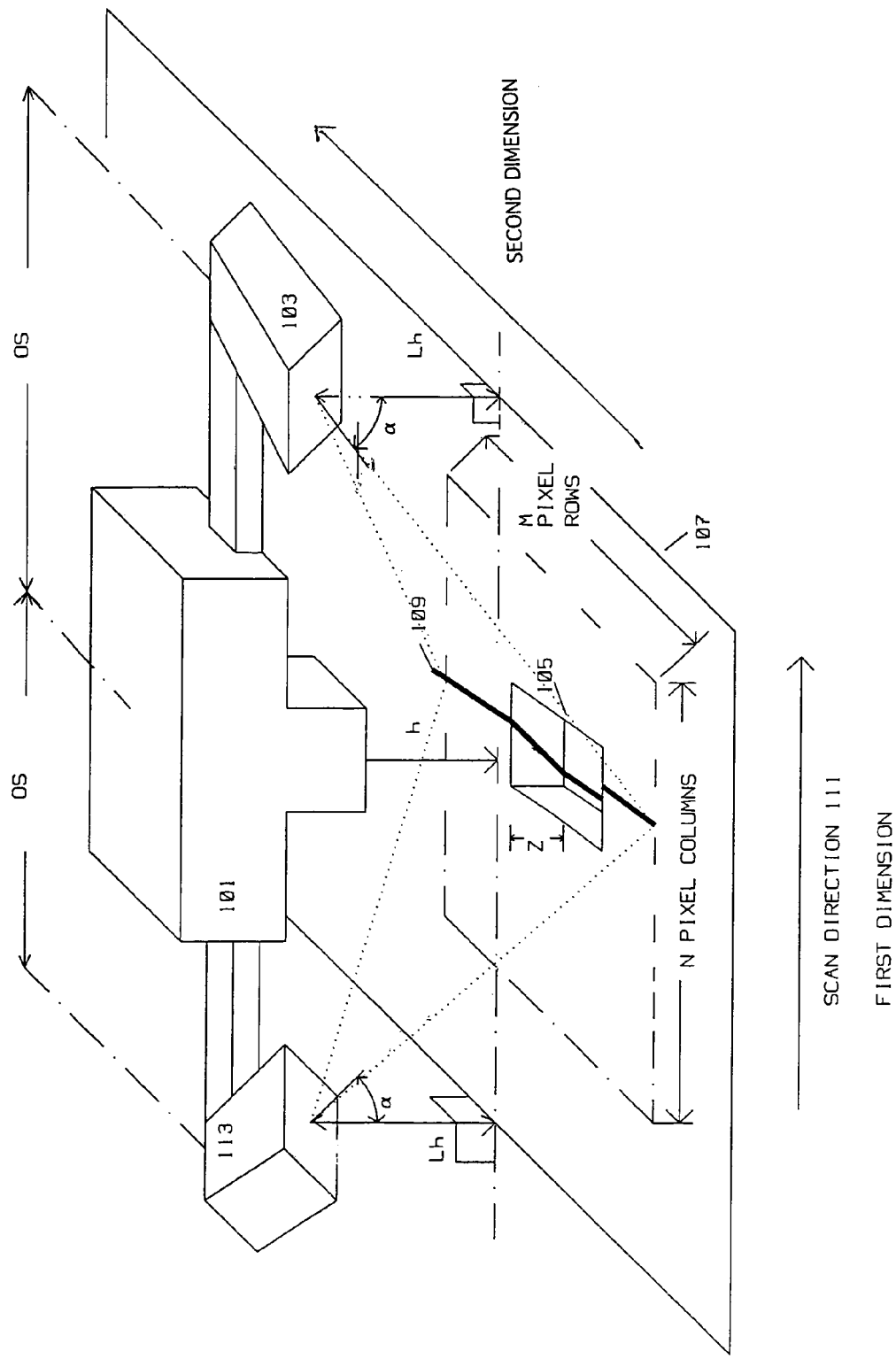
FIG. 1 describes an angle view of the scanner of the present invention where two laser emitters illuminate an area FIG. 2 describes a plurality of regions covering the area to be imaged.

As shown in FIG. 1, in one embodiment, a rectilinear laser scanner detects a three dimensional detail 105 on a (typically) flat area 107. Area 107 has a first dimension along a scan direction 111 and a second dimension perpendicular to said first dimension. Detail 105 has a dimension z perpendicular to area 107. While z is shown to have a dimension below area 107, it can also extend above area 107. The scanner comprises a traverse for moving a first laser emitter 103 coupled to an imaging sensor 101. In an embodiment where the traverse moves rectilinearly, the traverse moves parallel to the first dimension of said area 107 in scan direction 111. The imaging sensor 101 and a first laser emitter 103 are at a height h above area 107. Laser emitter 103 is positioned behind imaging sensor 101 by a fixed offset OS. The effect of offset OS is to orient laser emitter 103 at a depression angle $\alpha$ with respect to area 107 so that the emitted laser beam from laser 103 meets area 107 within the bounds of the image scan second dimension and image scan first dimension of imaging sensor 101. Depression angle $\alpha$ is in a plane oriented along the first dimension of area 107, and scan direction 111. The plane of angle $\alpha$ is perpendicular to area 107. Offset OS is further detailed in FIG. 5.

In another embodiment, the traverse can also move circularly along a circumference having a radius around a point. The scan direction is now circular, following the circumference. The imaging sensor is displaced with respect to the laser emitter by a fixed number of degrees. The laser emitter is radially located to generate a radial laser line. The imaging sensor is displaced along the radius with every rotation. The same range measurement concepts apply, but using a cylindrical coordinate system.

Returning to the embodiment of FIG. 1, when used in conjunction with first laser emitter 103, second laser emitter 113 is located at a spacing OS from imaging sensor 101 along the first dimension of area 107. The first laser emitter 103 projects a first laser line 109 along the second dimension of said area 107 at a frame first dimension position. Typically, the Z dimension of detail 105 is much less than the image frame first dimension or second dimension.

Second laser emitter 113 is located a spacing OS from imaging sensor 101 and also pointed at a depression angle $\alpha$ to the scan direction. Thus second laser emitter 113 and first laser emitter 103 straddle imaging sensor 101. Second laser emitter 113 projects a second laser line, for example, superimposed over, and aligned with the same location on area 107 as that covered by laser line 109, at the same frame first dimension position, across the second dimension of said image frame. In one embodiment, second laser emitter 113 is activated at alternate times with first laser emitter 103 to perform alternate measurements, thereby reduce shadow related errors. It is envisioned that first laser emitter 103 and second laser emitter 113 may also be activated concurrently.

Imaging sensor 101 is sensitive to laser reflections from laser line 109 illuminating area 107 and detail 105. The reflections are produced by laser line 109 illuminating both area 107 and detail 105. Imaging sensor 101 images a region of area 107, including the laser reflections from area 107 and from detail 105 to generate a image frame. The image frame has a image frame first dimension and a image frame second dimension. The image frame second dimension is aligned along the second dimension of area 107. The image frame covers reflections from detail 105 induced by laser line 109 as well as area 107.

A computer, having a pipeline portion and an auxiliary portion, preferably internal to imaging sensor 101, is connected to imaging sensor 101 for reception of the image frame. The pipeline portion examines the image frame for the presence of reflections from area 107 as well as reflections from detail 105 within particular pixels acquired by imaging sensor 101. Reflections from area 107 induced by laser line 109 are imaged as a (straight) line within the image frame. Conversely, reflections from detail 105 produced from laser line 109 are imaged at a distance from the line imaged from area 107 as present within the image frame.

In a preferred embodiment, a pipeline portion of the computer calculates the location of the laser line on the examined surface. The output from the pipeline portion is reduced substantially as compared to the raw image input. This reduces the amount of data to be used for further calculations in the auxiliary portion of the computer. The auxiliary portion computes depth, the Z dimension, of detail 105 using the geometry shown in the figures, using data generated by the pipeline portion. The Z dimension is computed from the reflections generated by detail 105 using depression angle $\alpha$, offset OS and known height h of imaging sensor 101 and laser emitter above area 107.

The auxiliary portion reports the range of the z dimension of the detail at a coordinate within the second dimension and first dimension of area 107 covered by the scan. A constant may be subtracted from the range measured to laser line 109 for each pixel to improve image rendition.

It is envisioned that the auxiliary and pipeline portions are combined in a single computer, reducing costs and increasing speed of the interface(s) linking the two portions.

Figure 2:
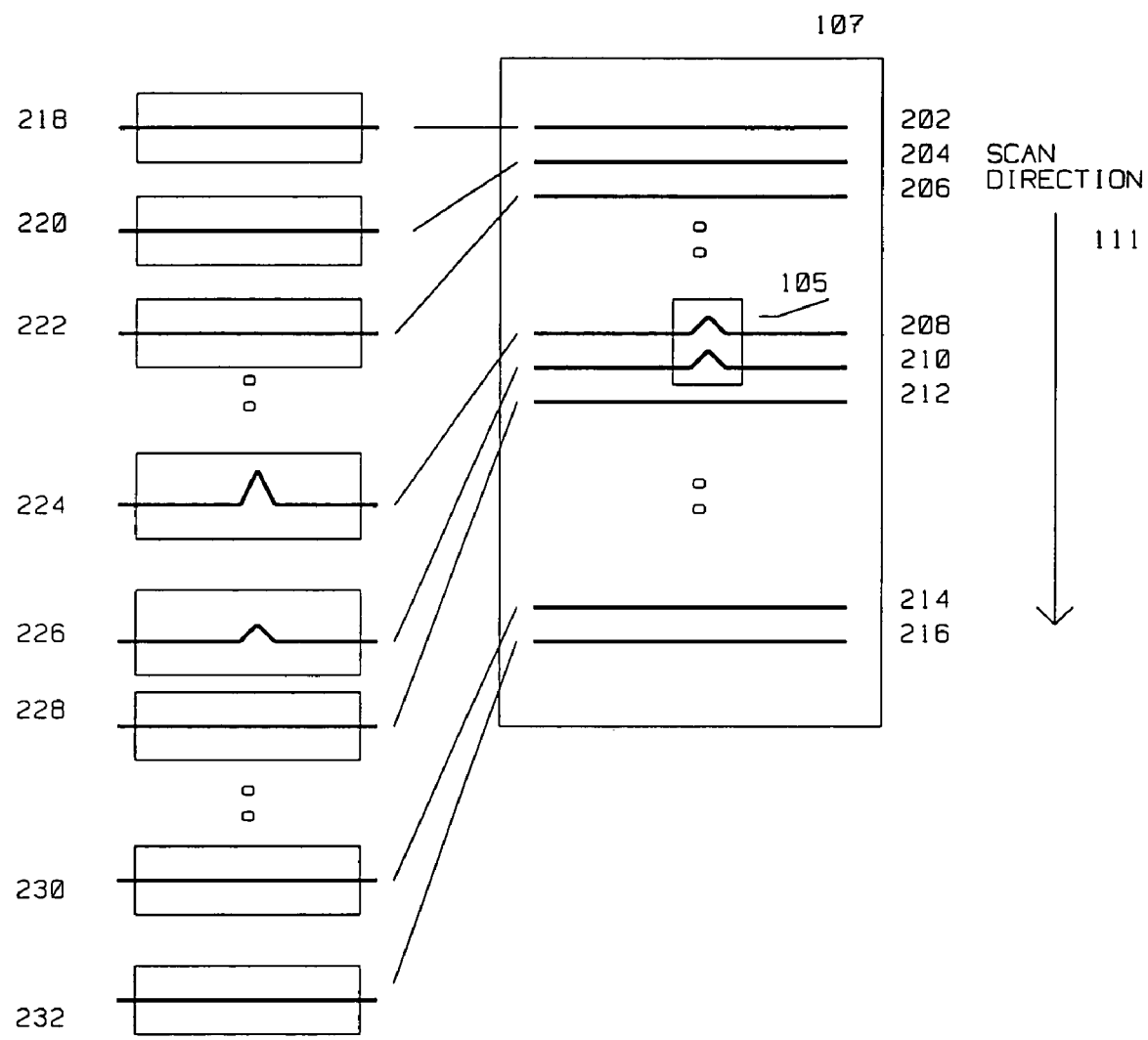

The computer also synchronizes the movement of the traverse connecting first laser 103, second laser 113 and image sensor 101, and reception of the image frame in a plurality of regions, the regions aligned along scan direction 111. The regions are imaged parts of area 107 and any details that may be thereon. The multiple regions are detailed in FIG. 2. Regions 218, 220, and 222 correspond to an image frame around laser line 202, 204 and 206 respectively. Thus, when shown over area 107, regions 218, 220 and 222 overlap in the direction of scan direction 111. Since the laser line is detected by imaging sensor 101 as a straight line, no details are found in either frame 218, 220 or 222.

Similarly, region 224, 226 and 228 correspond to laser lines 208, 210 and 212 over area 107. Laser lines 208, 210, and 212 have encountered detail 105 on area 107. Hence, laser lines 208, 210, and 212 have straight portions, corresponding to reflections from flat area 107 as well as reflections imaged at a distance from the straight portions corresponding with the presence of detail 105, detail 105 having a dimension perpendicular to area 107. The image of the dimension of detail 105 is manifested by portions of laser lines 208, 210 and 212 being located at a distance from the laser line reflected by area 107 along the image frame first dimension. The reflection of the laser line from flat area 107 corresponds to the straight portion of each of the laser lines.

Regions 230 and 232 correspond to imaged laser lines 214 and 216. Regions 230 and 232 overlap, and are the last regions to be examined on area 107. No details are present, thus imaged laser lines 214 and 216 are straight lines.

The size of a region such as 224, 226 or 228 is chosen as a tradeoff between scan speed and expected maximum z depth. If the details to be found are relatively large, then the imaging sensor 101 is positioned further away from area 107 (h large). Now each pixel of sensor 101 covers a larger area, and fewer regions are required to cover the whole of area 107.

The spacing of regions along scan direction 111 is determined by the expected size of the detail to be analyzed on area 107. For example, if detail 105 is expected to occupy one pixel dimension over area 107, then a typical separation between adjacent projected laser lines, as determined by the scan rate, is ½ pixel along area 107, or less.

Figure 3:
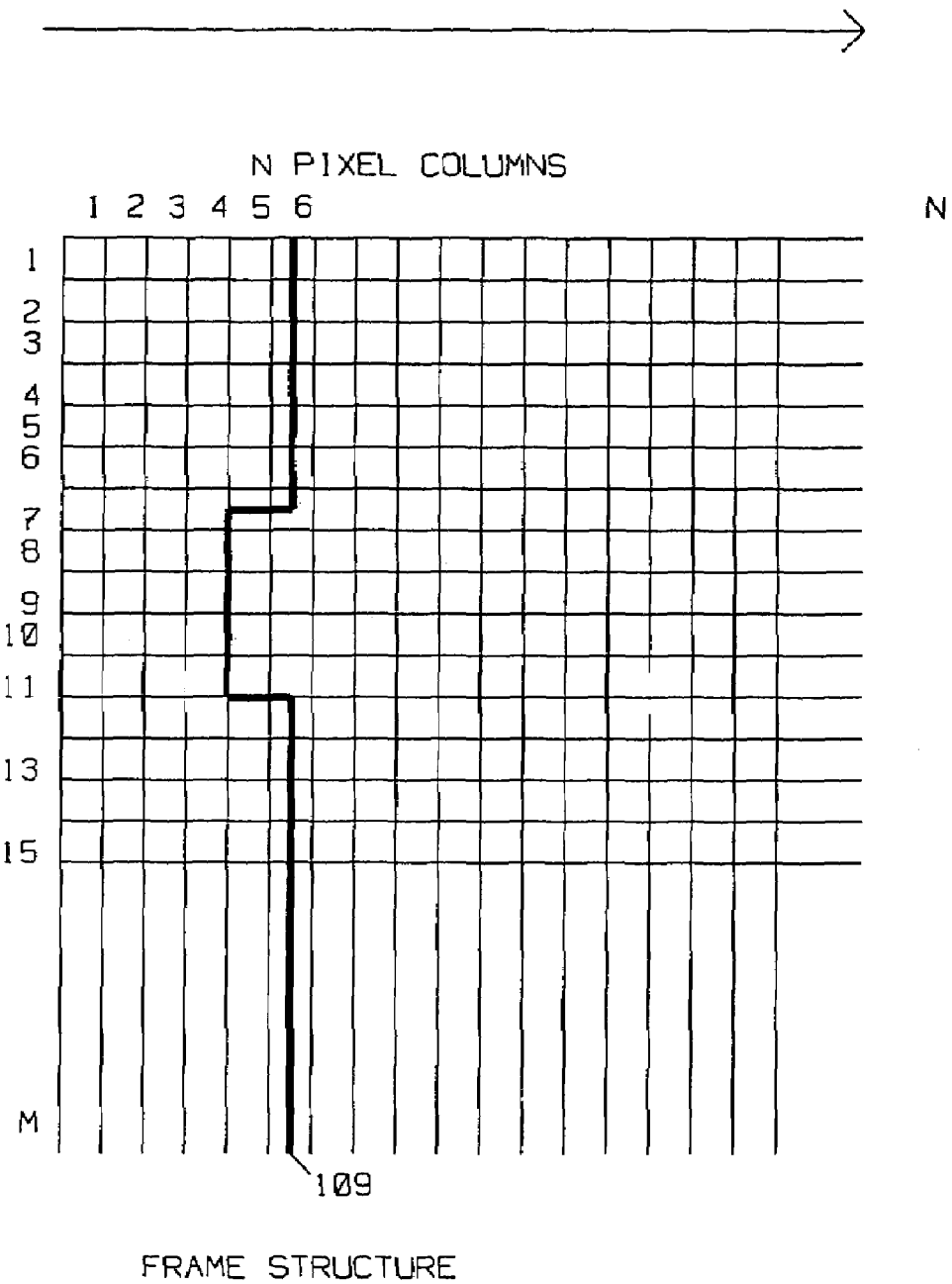
FIG. 3 describes a image frame of the present invention where a detail is reflecting laser energy from the area being scanned.

FIG. 3 shows a typical image frame of this invention. The image frame is generated from imaging sensor 101 imaging a region, such as 208, containing detail 105. The image frame is formed from a plurality of pixels. The pixels are organized in an orthogonal coordinate system of M pixel rows and N pixel columns. The N pixel columns are aligned with scan direction 111, covering a image frame first dimension. The M pixel rows are aligned with the second dimension of area 107, and covers an image frame having a second dimension. The frame second dimension and frame first dimension are dependent on the optical characteristics of imaging sensor 101, that is, its field of view as well as the height h optical sensor 101 is above area 107. Thus, h is known, as well as the solid angle covered by optical sensor 101, thus the image frame second dimension and first dimension can be computed a priori, before the start of scan. Choosing h in advance determines the position of a frame as imaged by imaging sensor 101.

Each pixel is digitized in optical sensor 101 and has an intensity described by A bits, for example A=8. The A bits are representative of the amplitude of laser emissions reflected from either a first laser line, a second laser line, or both laser lines simultaneously, interacting with detail 105 and area 107. This intensity corresponds to the image formed onto a pixel by the imaging sensor 101 generating the image frame.

Further defining terms:

1, 2, . . . K is the number of rows in the subset of pixels read off the image sensor per clock cycle at a selected rate;

1, 2, . . . L is the number of columns in the subset of pixels read off the sensor per clock cycle at said rate;

1, 2 . . . M is the total number of rows generated by the image sensor (array);

1, 2, . . . N is the total number of columns generated by the image sensor (array);

A is the number of bits used to resolve the light intensity at each pixel location, i.e. the amplitude of light intensity is digitized, and represented with A number of bits.

The laser line 109 is oriented such as shown in FIG. 3, along the M pixel rows, perpendicular to the scan direction.

Using these variables, the computer computes the central location of laser line 109 from reflections induced by laser line 109 on area 107 as well as detail 105, and imaged within the image frame by performing a calculation characteristic of a center of mass calculation, (described elsewhere herein).

The image frame from the imaging sensor includes imaging one of the regions formed from a plurality of pixels. The pixels from the region are delivered at a rate compatible, or matching with the processing speed of pipeline(s) within the computer. The pixels forming the image frame are organized in an orthogonal coordinate system of M pixel rows and N pixel columns. The N pixel columns are aligned with said scan direction covering the image frame first dimension. M pixel rows are aligned with the second dimension covering the second dimension. Each pixel has an intensity described by A bits, said A bits representative of the amplitude of laser emissions reflected from said laser line interacting with said detail and said area, and imaged onto said pixel by said imaging sensor. The processing step uses a pipeline portion of the computer. The computer has a first pipeline and a second pipeline. The first pipeline and the second pipeline processing speed is matched to the pixel delivery rate from the imaging sensor for computing a central location of the laser line as imaged within the image frame by performing the following steps.

First, comparing within said first pipeline said intensity described by A bits of a subset of K pixel rows by L pixel columns starting at a N1 pixel column position within said M pixel rows by N pixel columns within said image frame against a threshold, retaining said intensity for said subset of K pixel rows by L pixel columns above said threshold while setting the rest to zero, thereby generating a K by L thresholded subset. This results in a K by L thresholded subset starting at N1 Pixel column position.

Next, multiplying in said first pipeline said K by L thresholded subset intensity of A bits of said K pixel rows by L pixel columns by their respective L column position within said image frame and summing across each of said K rows to obtain K partial numerators. This results in K partial numerators for a particular K by L block. In one embodiment, K=1, L=8, (e.g. 8 by 1) at pixel column N1 in the first pipeline.

Next, summing across said K pixel rows of said thresholded subset for each L pixel column to obtain K partial denominators in said second pipeline. This results in K partial denominators for a particular K by L block at pixel column N1.

The K partial denominators are delayed from the second pipeline until the K partial numerators are available from the first pipeline.

The comparing, multiplying, summing and delaying steps are repeated at said rate starting at column locations N1, N1+L, N1+2L . . . N/L times to cover the N pixel columns. The K partial numerators and K partial denominators are concurrently accumulated (summed) over each of the K pixel rows. After N/L iterations this result in one total numerator and one total denominator for each of the K pixel rows.

Where K is greater than one, i.e. two or more rows are processed concurrently, the steps are exactly the same, but duplicated because of the higher computing capacity. That is, above steps are performed at the same rate, starting at row locations K1, K1+K, K1+2K . . . M/K times to cover all M rows.

Next, divide the total numerator by its respective K total denominator for each of said K rows thereby identifying the location of a maximum value present within the image frame. This maximum value is indicative of the column where the laser line has been imaged said image frame. That is, the result is indicative of the location of the imaged (straight) laser line on area 107, in one of the N pixel columns for each of M pixel rows.

In a best mode implementation A is 8 bits, K rows is one pixel and L columns is 8 pixels. _is typically 20 degrees. These quantities optimize the use of a readily available pipeline processor to perform above steps efficiently without the need to store large amounts of image data.

In yet another best mode implementation, A is 10 bits, K rows is one pixel, and L columns is 16 pixels.

FIG. 3 further details operation of the algorithm. For example, identifying the location of the laser line proceeds down M=1 pixel row and identifies the presence of laser line 109 in column N=6. The algorithm examines all N pixel columns, typically 1024, at row 1. Then row M=2 is examined for all N pixel columns. The process is repeated for all M pixel rows. This row by row examination outputs the position of the laser line across the field of view, image frame first dimension and image frame second dimension, for imaging sensor 101.

As shown in FIG. 3, the laser line reflected from area 107 is continuous up to M pixel row 7 the laser line present in N pixel column 6. At M pixel row 7, the laser line is reflected from detail 105 in rows 4 and 5. The shift of the laser line from N pixel column 6, to columns 4 and 5, in this image frame, shows that the laser line has "advanced" about 1.5 rows, indicative of laser line 109 illuminating a detail at a range above or below area 107. The reflections at a distance from N pixel column 6, shown in column 4 and 5, come from the bottom area of detail 105, an amount z below area 107, reflecting laser line 109. Thus the dimension Z, the depth of detail 105 below area 107 (shown in FIG. 5) is computed from the angle α (function of OS, h and the extent of a pixel, for example, frame first dimension/1024 by frame second dimension/1024. More simply, if high accuracy of depth is not required, and only a depression in area 107 need be identified, a fixed number is subtracted from the computed range (e.g., the difference of 1.5). The resulting difference is directly displayed on the display at the column/row position it is found. For example, the factor 1.5 is obtained from subtracting the position of the reflections from the area 107 (column 6) from those generated by detail 105 (col 4, 5). For example, a gray scale on the display is calibrated to display shade 1 to be equivalent to a difference of 1, shade 2 for a difference of 2, shade 3 for a difference of 3 etc. The display will now show a map of gray scales of differences from the area at the proper second dimension/first dimension location.

A color display, instead of the gray scale, enhances the visibility of the differences by assigning contrasting colors to each difference value, such as red for 1, blue for 2, yellow for 3 etc.

Shadow Processing

Figure 5:
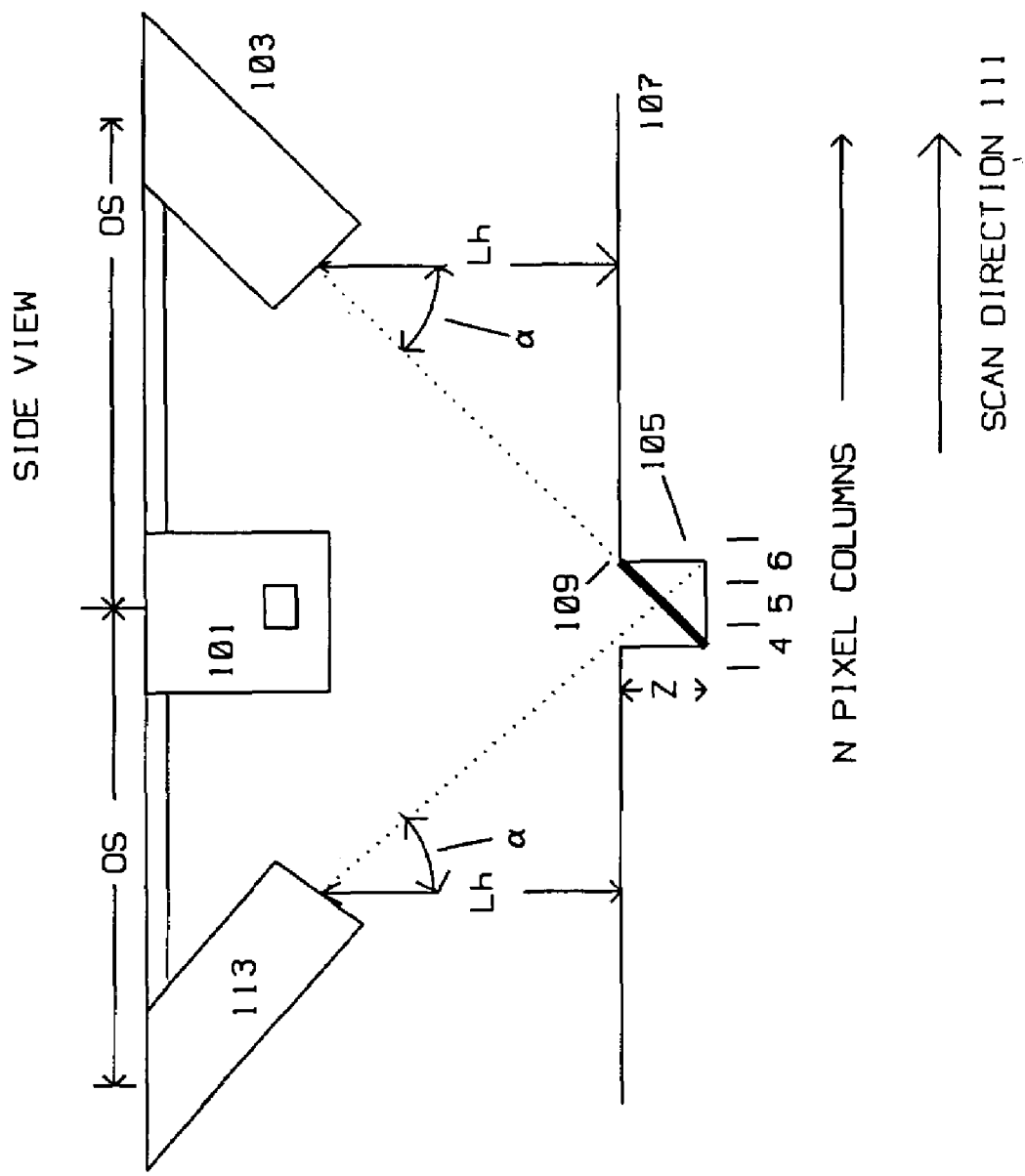
FIG. 5 describes a side view of the scanner of this invention.

The geometry for computing the dimension z of detail 105 in the presence of shadows is shown in FIG. 5. When illuminating area 107, reflection from laser line 109 (generated by laser emitter 103) off area 107 are imaged in N pixel column 6 for M pixel rows 1 to 7. Once detail 105 is encountered, a few N pixel columns (e.g. 5, 6) will not be illuminated by reflections from the laser line 109, as they are in the shadow cast by the edge formed by the intersection of area 107 and the vertical extent of detail 105. The shadow is computed from depression angle α, location $L_h$ of laser emitter 103, spacing OS, with respect to detail 105. In addition, depth z of detail 105 along with the other variables will determine how many pixels along laser line 109 will be shadowed when laser emitter 103 is illuminating. Depression angle α is measured perpendicular to the plane of area 107, along the scan direction.

Figure 4:
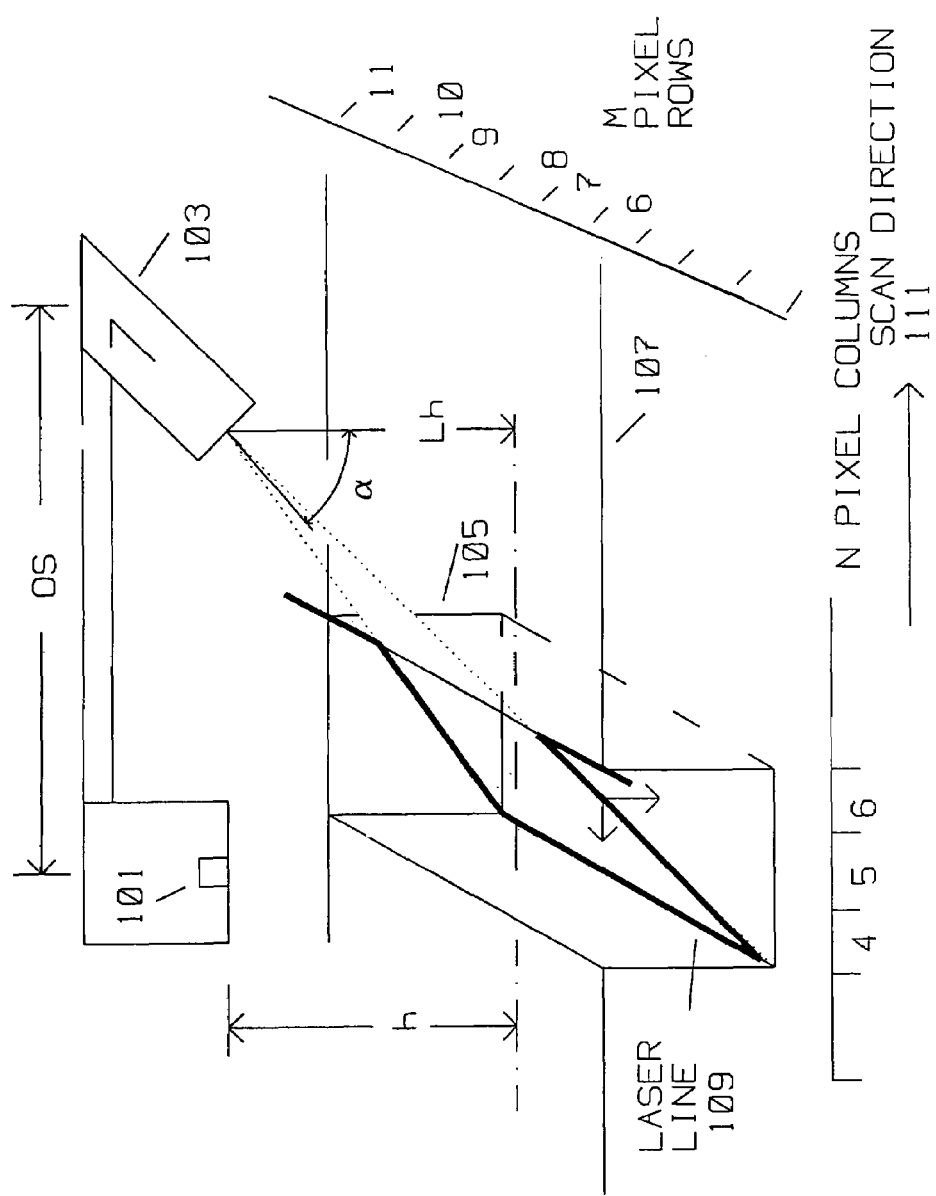
FIG. 4 describes the effect of a detail having a vertical dimension extending below the imaged area and the associated shift in the imaged position of a straight laser line.

As shown in FIG. 5, the laser line from laser 103 on area 107 is presented to imaging sensor 101 at frame first dimension, N pixel col N=6. When encountering depth Z, the laser line is presented to imaging sensor 101 at frame first dimension N=4. Thus the position of the laser line has shifted because of detail 105 from N=6 to N=4, indicating the presence of detail 105 on area 107. The computation of Z from the known variables, as shown in FIG. 4, are performed within the computer, part of imaging sensor 101. z is displayed on a monitor as a departure from area 107 or printed out for each pixel within the image frame.

To avoid the shadow cast by laser emitter 103, laser emitter 113 having the same geometric location vertically as laser emitter 103, the same offset OS, but behind imaging sensor 101, is activated. Now, with laser illumination from behind, a laser line emitted from laser 113 will illuminate the originally dark pixels N=5, 6 avoiding the original shadow from laser emitter 103.

Therefore, to reduce or avoid shadows, laser emitter 103 is coupled to a second laser emitter 113, both oriented at the same depression angle α. Laser emitter 103 is aimed at a first depression angle α The second laser emitter 113 is oriented at a second depression angle −α. The first depression angle and the second depression angle are measured in a plane perpendicular to area 107, with respect to scan direction 111, and are typically equal.

The laser emitter 103 and laser emitter 113 straddle image sensor 101 along said scan direction at a spacing OS. Laser emitters 103 and 113 are offset with respect to imaging sensor 101 by an offset +/−OS along scan direction 111. It is this offset OS that allows viewing area 107 with illumination from an angle α with respect to area 107. The image collected by imaging sensor 101 is along the axis of imaging sensor 101. Imaging sensor 101 is displaced by offset OS in front of the source of laser emitters 103 and 113 along scan direction 111.

FIG. 5 presents a side view for the case where either one or two laser emitters are used to illuminate narrow laser line 109 upon area 107. Laser emitter 103 is directly superimposed on laser emitter 113, or can operate singly, depending on the need for shadow corrections. Depression angle α of laser emitter 103, is determined by laser emitter 103 height over area 107, $L_h$, and offset OS. Because of α, the bottom area of detail 105, located Z below area 107, is mapped in image frame pixel rows M=4–5 instead of row M=6 where area 107 is expected, as detailed in FIG. 3. Imaging sensor 101 captures the image frame inclusive of the position of laser line 109 on area 107 and detail 105.

Two Parallel Pipelines

The Center of Mass Calculation for identifying the position of laser line 109 within the image frame is performed in a pipeline processor. This special purpose processor can be used because no significant amount of storage is required to complete the location and computation of dimensions of detail 105 within the image frame. Because the need for large amounts of storage are avoided, the high performance of the pipeline processor can be fully exploited yielding a scanner that can scan large areas for small details in a relatively short time, presenting real time results.

The application of the Center of Mass calculation on each column of an image frame will convert the image frame into one line of values (equal to the number of columns) identifying of the row position at each column of the laser line reflected from the area 107 and detail 105 therein. This calculation can be summarized by:

$$\Sigma(\text{Row-Position} \times \text{Intensity})/(\Sigma \text{Intensity})$$

Two pipelines are used to calculate the central location of the laser line 109 from the input pixel intensity data, for example, in 64 bit parallel increments, 8 pixels, 8 bits each. The calculation is repeated for each column making up the image frame.

First Pipeline

The stage 1 operation is a threshold function. Here, each of the 8 input pixel intensities are output only if the intensities are above a certain specified threshold. When any pixel intensity is below or equals the threshold, a zero intensity is presented at the output in its place. This operation occurs over one stage or clock cycle.

Next, the numerator is computed. The numerator is part of the center of mass formula and as such multiplies the 8 input intensities by their respective sensor array positions and adds them together. The multiplication process is implemented, for example, using core module multipliers and occurs over a four-stage pipeline. The accumulation of the multiplication results occurs over an additional four-stage pipeline. The pipeline stages and their functions are:

Stage 2 Function: The sensor position for each input pixel intensity is generated based on an input counter.

Stages 3-6 Function: Each of the 8 parallel input intensities are simultaneously multiplied by their respective array positions, resulting in 8 separate multiplication results.

Stage 7 Function: The first of the 8 multiplication results is added to the second, the third result is added to the fourth etc. producing the first set of four partial sums.

Stage 8 Function: The second set of partial sums is calculated by adding the first of the four results from above to the second and the third result to the fourth. Two partial sums remain at this point.

Stage 9 Function: The final partial sum is calculated by adding the 2 partial sums from the above step. This sum represents the total all parallel intensities multiplied by their respective positions.

Stage 10 Function: The running total is updated by adding the result from step 7 into the current total.

Second Pipeline

The denominator is also part in the center of mass formula and as such accumulates the input intensities in an eight-stage pipeline. The denominator calculation works in parallel with the numerator using the second pipeline within the processor.

Stage 2 Function: The first set of partial sums is calculated by adding the first of the eight inputs to the second, the third to the fourth, etc. Each addition results in one partial sum for a total of four.

Stage 3 Function: The second set of partial sums is calculated by adding the first of the four results from above to the second and the third result to the fourth. Two partial sums remain at this point.

Stage 4 Function: The final partial sum is calculated by adding the 2 partial sums from the above step. This sum represents the total all parallel intensities input to the module from step one.

Stage 5 Function: The running total is updated by adding the total from stage 3 into the current total.

Stage 6-10 Function: The result from this second pipeline is delayed by 4 stages (clock cycles) so the total delay in this module is equal to the delay in the computation of the numerator.

Hardware Divider performs the division operation in the center of mass calculation. It is implemented with an available FPGA module. While FPGA is a convenient implementation, other options can be used, such as a DSP unit. The 16-bit output from the divider module represents the laser position corresponding to a particular sensor row. This laser position is then used to triangulate the distance z from known geometric information. The same function could also be performed by a Digital Signal Processor (DSP) core programmed for the particular function.

Method

Figure 6:
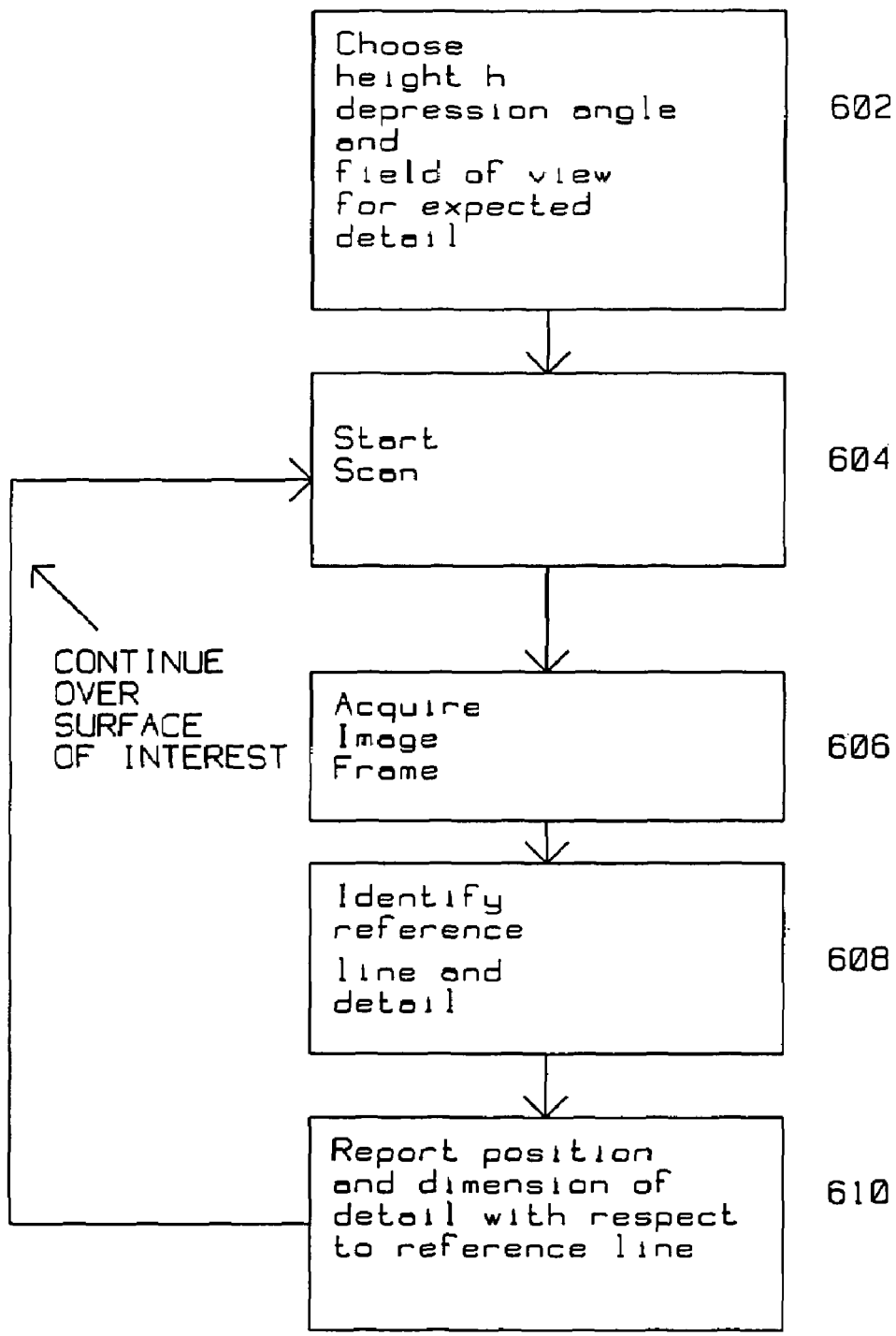
FIG. 6 describes the method steps of this invention.

FIG. 6 details the major steps in operating the scanner of the present invention. Selection step 602 is the first part of the method of using the scanner described herein. The user selects the height h and area of coverage (in a manner similar to selecting a focal first dimension of the imaging lens) for imaging sensor 101 in accordance with expected dimensions z of a detail on area 107. This optimizes the scanner to detect details in a certain range of dimensions, and also assumes some a priori knowledge of the detail dimension to be detected.

Having made that selection, the method for detecting a three dimensional detail 105 on flat area 107 where flat area 107 has a first dimension and a second dimension, and detail 105 has a dimension perpendicular to said area (e.g. depth), comprises the steps of:

a) Step 604—Start scan by moving a laser emitter 103 mechanically coupled to imaging sensor 101 parallel to the first dimension of area 107 in scan direction 111, where imaging sensor 101 and laser emitter 103 are at the pre-selected height h above flat area 107, and laser emitter 103 is oriented at pre-selected depression angle α with respect to area 107, depression angle α in a plane along the first dimension of flat area 107, and perpendicular to area 107. The scan direction can be along a straight line (rectilinear) or circular, along the circumference of a circle.

b) Step 606—for the rectilinear case, acquire an image frame by projecting laser line 109 using laser emitter 103 along the second dimension of area 107, the second dimension perpendicular to the scan direction 111 over area 107. Imaging sensor 101 is sensitive to laser reflections from area 107 and from detail 105 produced by the interaction with laser line 109. Generate an image frame using imaging sensor 101, the image frame including the laser reflections from area 107 and from detail 105, the image frame second dimension aligned along the second dimension of area 107.

c) Step 608—Identify laser line and detail 105 on area 107, if any, by processing the image frame in the pipeline portion of the computer connected to imaging sensor 101 for reception of the image frame. The pipeline portion examines the image frame pixel by pixel for the presence of reflections from area 107 and reflections from detail 105, where reflections from area 107 produced from interactions with said laser line 109 are imaged as a line within the image frame. Conversely, laser reflections from detail 105 produced from interactions with the same laser line 109 are imaged at a distance from laser line 109 within the image frame. The laser line reflection is straight for an exemplary flat area 107.

For example, steps 604 and 608 are performed up to 500 times per second while the traverse is moving along the scan direction.

d) Step 610—Report range of detail 105 as illuminated by laser line 109 to a display by computing the dimension of detail 105 in a direction perpendicular to area 107 using the distance of said reflections derived from detail 105, with respect to the laser line 109, depression angle $\alpha$, and height h. The actual depth of detail 105 is computed in the auxiliary part of the computer by triangulation. The reporting of the dimension of detail 105 is done for every column within the image at the end of the computation for that column, at a coordinate within the second dimension and first dimension over area 107 covered by the image frame. Thus for each of N pixel columns, a value indicative of the M row position of the laser line will be retained for each scan. This value, subtracting the value associated with the area, is shown on a display. The display becomes the "memory" of N pixel column by column results for this scanner, precluding the need for digital storage of intermediate results within the scanner itself. If the display is to show actual depth Z, the values can be further refined for accurate depth rendition.

All references cited in this document are incorporated herein in their entirety.

Although presented in exemplary fashion employing specific embodiments, the disclosed structures are not intended to be so limited. For example, although a straight laser line is used as a best mode embodiment, a curved laser line can be used instead. The curved laser line is made to conform to specific contours of interest of the area to be inspected. The laser line, when encountering a spherical area, can be tailored in shape to produce a straight line in two-dimensional space seen by the imaging sensor. Ranging to this laser line are now interpreted in accordance with this invention to identify dimensions of details illuminated by the line. Using concepts described herein, a curved laser line increases the scanners sensitivity to details having specific contours, thus increasing its utility.

Similarly, while a plurality of lasers can be used for multiple laser lines from different heights above the area to be inspected and positioned at different depression angles. Multiple laser positions can be customized for specific dimensions of details on the area, again increasing the utility and accuracy of the laser scanner while preserving its high scan rate.

Those skilled in the art will also appreciate that numerous changes and modifications could be made to the embodiment described herein without departing in any way from the invention.

What is claimed is:

1. A laser scanner for computing a range from a first laser line illuminating a detail to an imaging sensor, said first laser line emitted from a first laser emitter, said first laser line illuminating said detail within an area covered by said imaging sensor, said area having a first dimension and a second dimension, said detail having a dimension perpendicular to said area, said scanner comprising:

a traverse for moving said first laser emitter coupled to said imaging sensor, said traverse moving parallel to said first dimension of said area in a scan direction for a scan, said imaging sensor and said first laser emitter at a height above said area, said first laser emitter positioned at an offset along said scan direction with respect to said imaging sensor, said first laser emitter oriented at a depression angle with respect to said area, said depression angle in a plane along said first dimension, said plane perpendicular to said area, said depression angle invariant during said scan, said first laser emitter projecting said first laser line along said second dimension of said area at a frame first dimension position, said second dimension perpendicular to said scan direction over said area;

said imaging sensor sensitive to laser reflections from said detail produced by said first laser line, said imaging sensor imaging said laser reflections from said detail within said area to generate a image frame, said image frame second dimension aligned along said second dimension and inclusive of said frame first dimension position;

a computer connected to said imaging sensor for reception of said image frame, said computer examining said image frame for the presence of reflections from said detail;

said computer computing said range to said detail from said imaging sensor using said height, said depression angle and said offset; and said computer displaying said range to said detail as indicative of said dimension of said detail on a display at a coordinate within said second dimension and said first dimension over said area covered by said image frame.

2. The laser scanner as in claim 1, wherein said computer displays said dimension of said detail within said image frame from said range of said reflections from said detail by subtracting a fixed distance from said range.

3. The laser scanner as in claim 2, wherein said computer synchronizes the movement of said traverse and reception of said image frame in a plurality of regions, said regions part of said area, said regions aligned along said scan direction, said regions overlapping over said first dimension so that one or more of said details are detected over said first dimension and said second dimension of said area.

4. The laser scanner as in claim 3, wherein said image frame from said imaging sensor imaging one of said regions is formed from a plurality of pixels, said pixels delivered at a rate, said pixels organized in an orthogonal coordinate system of M pixel rows and N pixel columns, said N pixel columns aligned with said scan direction covering an image frame first dimension and said M pixel rows aligned with said second dimension covering an image frame second dimension, each pixel having an intensity described by A bits, said A bits representative of the amplitude of laser emissions reflected from said laser line interacting with said detail and said area, and imaged onto said pixel by said imaging sensor;

wherein said computer uses a first pipeline and a second pipeline, said first pipeline and said second pipeline operating at said rate to compute a central location of said first laser line as imaged within said image frame by performing the steps of:

comparing within said first pipeline said intensity described by A bits of a subset of K pixel rows by L pixel columns starting at a N1 pixel column position within said M pixel rows by N pixel columns within said image frame against a threshold, retaining said intensity for said subset of K pixel rows by L pixel columns above said threshold while setting the rest to zero, thereby generating a K by L thresholded subset; first multiplying in said first pipeline said K by L thresholded subset intensity of A bits of said K pixel rows by L pixel columns by their respective L column position within said image frame and summing across each of said K rows to obtain K partial numerators;

first summing across said K pixel rows of said thresholded subset for each L pixel column to obtain K partial denominators in said second pipeline; delaying said K total denominators from said second pipeline until said K partial numerators are available from said first pipeline; repeating said comparing, said first multiplying, said first summing and said delaying step at said rate starting at column locations N1, N1+L, N1+2L . . . N/L times to cover said N pixel columns, and concurrently summing said K partial numerators and K partial denominators for each of K pixel rows in said second pipeline N/L times obtaining one total numerator and one total denominator for each K pixel row;

repeating said comparing, said first multiplying, said first summing and said delaying step at said rate starting at row locations K1, K1+K, K1+2K . . . M/K times to cover said M rows; and dividing each of said K total numerator for each K row by its respective K total denominator for each K row thereby identifying a maximum value, said maximum value indicative of said row where said laser line has been imaged within said image frame.

5. The laser scanner as in claim 4, wherein said first laser emitter is coupled to a second laser emitter, said first laser emitter and said second laser emitter oriented at said depression angle along said area with respect to said first dimension;

said first laser emitter and said second laser emitter straddling said image sensor along said first dimension at a spacing; and said depression angle orienting said first laser emitter to illuminate said first laser line at said frame first dimension position, said depression angle orienting said second laser emitter to illuminate a second laser line at said frame first dimension position, said first laser line and said second laser line superimposed to cover at said frame first dimension position across said image frame second dimension within said region imaged by said image frame.

6. The laser scanner as in claim 5 wherein said computer activates said first laser emitter to obtain a first laser line and computes a first measurement of said dimension of said detail from reflections from said first laser line; and wherein said computer de-activates said first laser emitter and activates said second laser emitter to obtain said second laser line, and computes a second measurement of said dimension of said detail from reflections from said second laser line; said computer extracting a combined measurement of said detail from said first measurement and said second measurement, said combined measurement compensated for the presence of shadow e_effects from the interaction of said first laser line and said second laser with said detail using said depression angle, said height and said spacing.

7. The laser scanner as in claim 6, wherein said computer activates said first laser emitter and said laser emitter concurrently to generate said first laser line and said second laser line, said computer computing said dimension of said detail from said image frame created from reflections from said first laser line superimposed on reflections from said second laser line.

8. The laser scanner as in claim 7, wherein A is 8 bits, K is 1 pixel and L is 8 pixels.

9. The laser scanner as in claim 7, wherein A is 10 bits, K is one pixel, and L is 16 pixels.

10. The laser scanner as in claim 3, wherein said scan direction is a circular path, said second dimension is a radius defining said circular path, said imaging sensor positioned along said radius by said traverse for every revolution along said circular path.

11. A method for computing a range from a first laser line illuminating a detail to an imaging sensor using a laser scanner, said first laser line emitted from a first laser emitter, said first laser line illuminating said detail within an area covered by said imaging sensor, said area having a first dimension and a second dimension, said detail having a dimension perpendicular to said area, said method comprising the steps of:

moving a traverse coupling said first laser emitter to said imaging sensor, said traverse moving parallel to said first dimension of said area in a scan direction for a scan, said imaging sensor and said first laser emitter at a height above said area, said first laser emitter positioned at an offset along said scan direction with respect to said imaging sensor, said first laser emitter oriented at a depression angle with respect to said area, said depression angle in a plane along said first dimension, said plane perpendicular to said area, said depression angle invariant during said scan, said first laser emitter projecting said first laser line along said second dimension of said area at a frame first dimension position, said second dimension perpendicular to said scan direction over said area;

generating a image frame from said imaging sensor, said imaging sensor sensitive to laser reflections from said detail produced by said first laser line, said imaging sensor imaging said laser reflections from said detail within said area to generate said image frame, said image frame second dimension aligned along said second dimension and inclusive of said frame first dimension position;

processing said image frame in a computer connected to said imaging sensor for reception of said image frame, said computer examining said image frame for the presence of reflections from said detail; computing said range to said detail from said imaging sensor using said height, and said depression angle; and displaying said range to said detail as indicative of said dimension of said detail on a display at a coordinate within said second dimension and said first dimension over said area covered by said image frame.

12. A method as described in claim 11, further including displaying said dimension of said detail by subtracting a fixed number from said range, said dimension of said detail at a coordinate within said second dimension and first dimension over said area covered by said image frame.

13. A method as in claim 12, further including the step of synchronizing the movement of said traverse and reception of said image frame in a plurality of regions, said regions aligned along said scan direction, said regions overlapping over said first dimension so that one or more of said details are detected over said first dimension and said second dimension of said area.

14. A method as in claim 13, wherein said processing step of said image frame from said imaging sensor includes imaging one of said regions formed from a plurality of pixels, said pixels delivered at a rate, said pixels organized in an orthogonal coordinate system of M pixel rows and N pixel columns, said N pixel columns aligned with said scan direction covering an image frame first dimension and said M pixel rows aligned with said second dimension covering an image frame second dimension, each pixel having an intensity described by A bits, said A bits representative of the amplitude of laser emissions reflected from said laser line interacting with said detail and said area, and imaged onto said pixel by said imaging sensor, wherein said processing step uses a pipeline processor, said pipeline processor having a first pipeline and a second pipeline, said first pipeline and said second pipeline matched to said rate for computing a central location of said first laser line as imaged within said image frame by performing the steps of:

comparing within said first pipeline said intensity described by A bits of a subset of K pixel rows by L pixel columns starting at a N1 column position within said M pixel rows by N pixel columns within said image frame against a threshold, retaining said intensity for said subset of K pixel rows by L pixel columns above said threshold while setting the rest to zero, thereby generating a K by L thresholded subset;

first multiplying in said first pipeline said K by L thresholded subset intensity of A bits of said K pixel rows by L pixel columns by their respective L column position within said image frame and summing across each of said K rows to obtain K partial numerators;

first summing across said K pixel rows of said thresholded subset for each L pixel column to obtain K partial denominators in said second pipeline;

delaying said K total denominators from said second pipeline until said K partial numerators are available from said first pipeline; repeating said comparing, said first multiplying, said first summing and said delaying step at said rate starting at column locations N1, N1+L, N1+2L . . . N/L times to cover said N pixel columns, and concurrently summing said K partial numerators and K partial denominators for each of K pixel rows in said second pipeline N/L times obtaining one total numerator and one total denominator for each K pixel row;

repeating said comparing, said first multiplying, said first summing and said delaying step at said rate starting at row locations K1, K1+K, K1+2K . . . M/K times to cover said M rows; and dividing each of said K total numerator for each K row by its respective K total denominator for each K row thereby identifying a maximum value, said maximum value indicative of said row where said laser line has been imaged within said image frame.

15. A method as in claim 14, wherein:

said first laser emitter is coupled to a second laser emitter, said first laser emitter and said second laser emitter oriented at said depression angle, said depression angle measured perpendicular to said area with respect to said first dimension, said first laser emitter and said second laser emitter straddling said image sensor along said first dimension at a spacing; and said depression angle orienting said first laser emitter to illuminate said first laser line at said frame first dimension position, said depression angle orienting said second laser emitter to illuminate a second laser line at said frame first dimension position, said first laser line and said second laser line superimposed to cover same frame first dimension position across said image frame second dimension within said region imaged by said image frame.

16. A method as in claim 15, wherein said computer activates said first laser emitter to obtain a first laser line and computes a first measurement of said dimension of said detail from reflections from said first laser line; and wherein said computer de-activates said first laser emitter and activates said second laser emitter to obtain said second laser line, and computes a second measurement of said dimension of said detail from reflections from said second laser line;

said computer extracting a combined measurement of said detail from said first measurement and said second measurement, said combined measurement compensated for the presence of shadow effects from the interaction of said first laser line and said second laser with said detail using said depression angle, said height and said spacing.

17. A method as in claim 16, wherein said computer activates said first laser emitter and said laser emitter concurrently to generate said first laser line and said second laser line, said computer computing said dimension of said detail from said image frame created from reflections from said first laser line superimposed on reflections from said second laser line.

18. A method as in claim 17, wherein A is 8 bits, K is 1 pixel and L is 8 pixels.

19. A method as in claim 17, wherein A is 10 bits, K is one pixel, and L is 16 pixels.

20. A system for illuminating non-planar detail in a substantially planar sheet, divided into a rectangular array of rows (numbered m=1, . . . , M) and columns (numbered n=1, . . . , N) of pixels and containing information, the system comprising:

a light source, spaced apart from a substantially planar sheet and oriented at a selected depression angle $\alpha1$ relative to a normal direction, substantially perpendicular to a plane parallel to the sheet, that provides a narrow, substantially linear first segment of light that is received and reflected by the sheet, where a selected pixel with (row, column) location (m,n) in the pixel array has first measured light intensity value i1 (m,n) when a portion of the linear segment of light lies in the selected pixel, and has a second, distinct light intensity value when no portion of the first linear segment of light lies in the selected pixel;

a light scanner, spaced apart from the planar sheet and oriented to receive light from the light source that has been reflected from the sheet in approximately the normal direction, to form an image of a first scanner-illuminated portion of the planar sheet;

a computer that is programmed to perform at least the following procedures:

for each row, number m, in the pixel array, to compute a center of mass location or position CM1(m) in the row using a relation $$CM1(m) = \left\{\sum_{n1=1}^{N} n \cdot i1(m, n1)\right\} / \left\{\sum_{n2=1}^{N} i1(m, n2)\right\}$$

to compare the center of mass locations, CM1(m1) and CM1(m1+1) for at least two consecutive rows number m1 and m1+1 (m1=1, ..., M−1);

when the center of mass locations, CM1(m1) and CM(m1+1), are substantially the same, to interpret this condition as indicating that the sheet is planar in a neighborhood of the rows m=m1 and m=m1+1;

when a center of mass location difference satisfies |CM1(m1=1)−CM1(m1) |≧ΔCM(thr), where ΔCM (thr) is a selected positive value, to interpret this condition as indicating that the sheet is not planar in a neighborhood of at least one of the rows, number m=m1 and m=m1+1.

21. The system of claim 20, further comprising
a second light source, spaced apart from said substantially planar sheet and oriented at a selected depression angle α2 relative to said normal direction, that provides a narrow, substantially linear second segment of light that is received and reflected by the sheet, where a second selected pixel with (row, column) location (M', n') in said pixel array has a third measured light intensity value i2(m', n') when a portion of the second linear segment of light lies in the second selected pixel, and has a fourth, distinct light intensity value when no portion of the second linear segment of light lies in the second selected pixel;
wherein said light scanner is oriented to receive light from the second light source that has been reflected from said sheet in approximately said normal direction, to form an image of a second scanner-illuminated portion of said planar sheet;
wherein said computer is programmed to perform at least the following procedures;
for each row, number m', in said pixel array, to compute a center of mass location or position CM2(m') in the row using a relation $$CM2(m') = \left\{\sum_{n1'=1}^{N} n \cdot i2(m', n1')\right\} / \left\{\sum_{n2'=1}^{N} i(m', n2')\right\}$$

to compare the center of mass locations, CM2(m1') and CM2(m1'+1) for at least two consecutive rows number m1' and m1'+1 (m1'=1, ..., M−1);

when the center of mass locations, CM2(m1') and CM2(m1'+1), are substantially the same, to interpret this condition as indicating that said substantially planar sheet is planar in a neighborhood of the rows m=m1' and m=m1'+1;

when a center of mass locating difference satisfies |CM2(m1'+1) −CN(m1') |≧ΔCM(thr), to interpret this condition as indicating that said substantially planar sheet is not planar in a neighborhood of at least one of the rows, number m=m1' and m=m1'+1.

22. The system of claim 21, wherein each of said first light segment and said second light segment has a longitudinal axis, and the first and second longitudinal axes are substantially parallel to each other.

23. The system of claim 20, wherein said computer is further programmed so that:
when said location difference |CM1(m1+1)−CM1(m1)| is equal to a distance value h1, to interpret this difference condition as indicating that at least a first portion of said first scanner-illuminated portion of said sheet is displaced from a second portion of said first scanner-illuminated portion of said sheet, by a positive distance that is proportional to h1, in a direction substantially parallel to said normal direction.

24. The system of claim 20, wherein:
said illuminated portion of said planar sheet is chosen to be a narrow quadrilateral of said sheet that has a width less than a width of one of said pixels.

25. The system of claim 20, wherein said computer is further programmed to replace said measured first light intensity i1(m,n) associated with a pixel at said (row,column) location (m,n) by a processed light intensity pi1(m,n) that is 0 if said first measured light intensity is less than a selected positive threshold value i1(thr) and is equal to said measured light intensity if i1(m,n) is at least equal to i1(thr).

26. The system of claim 20, wherein said computer is further programmed to perform computation of said center of mass location CM1(m) in real time, without storage of any of said measured light intensity values i1(m,n).

* * * * *